United States Patent
Kocher

(10) Patent No.: US 11,854,303 B1
(45) Date of Patent: Dec. 26, 2023

(54) SELECTIVE FACIAL RECOGNITION ASSISTANCE METHOD AND SYSTEM (SFRA)

(71) Applicant: Robert William Kocher, McLean, VA (US)

(72) Inventor: Robert William Kocher, McLean, VA (US)

(*) Notice: Subject to any disclaimer, the term of this patent is extended or adjusted under 35 U.S.C. 154(b) by 0 days.

(21) Appl. No.: 16/602,091

(22) Filed: Aug. 9, 2019

Related U.S. Application Data

(60) Provisional application No. 62/764,654, filed on Aug. 15, 2018.

(51) Int. Cl.
*G06V 40/16* (2022.01)
*G06F 16/535* (2019.01)
*G06V 20/40* (2022.01)

(52) U.S. Cl.
CPC .......... *G06V 40/172* (2022.01); *G06F 16/535* (2019.01); *G06V 20/40* (2022.01)

(58) Field of Classification Search
CPC ............ G06K 9/00288; G06K 9/00711; G06F 16/535
USPC ......................................................... 382/118
See application file for complete search history.

(56) References Cited

U.S. PATENT DOCUMENTS

| | | | |
|---|---|---|---|
| 8,861,804 B1* | 10/2014 | Johnson .................. | G06F 16/51 382/118 |
| 2004/0017934 A1* | 1/2004 | Kocher .............. | G06K 9/00382 382/125 |
| 2016/0027079 A1* | 1/2016 | Schoeffler .......... | G06Q 30/0609 705/325 |
| 2018/0068173 A1* | 3/2018 | Kolleri .................... | G06F 16/29 |
| 2018/0220108 A1* | 8/2018 | Siminoff ............ | G08B 13/1966 |

* cited by examiner

*Primary Examiner* — Amandeep Saini

(57) ABSTRACT

The Selectable Facial Recognition Assistance Method and System (SFRA) allows law enforcement officers, military personnel, and other users the ability to rapidly and accurately identify wanted or known personnel, by combining the ability to select the type of examination, selection of optimized face matching algorithms and expert face examiners. The SFRA allows the user to select "Quick Looks" or "Long Looks" with respect to the level of detail of examination, along with race-based selected algorithms and expert face examiners. The race-based focused examination combining specialized algorithms and examiners will produce the highest confidence levels of match or no-match based on photographs taken, submitted, as well as database photographs. The SFRA will greatly assist users and persons being photographed to avoid false matches and false no-matches. This system will greatly reduce misidentification, profiling, or any other identification weaknesses that the systems and users may have.

6 Claims, 5 Drawing Sheets

SELECTIVE FACIAL RECOGNITION ASSISTANCE METHOD AND SYSTEM (SFRA)

CROSS-REFERENCE TO RELATED APPLICATION

This application claims priority from provisional application 62/764,654 titled Selective Facial Recognition Assistance Method and System (SFRA), filed on Aug. 15, 2018. The provisional application is incorporated herein by reference, in its entirety.

FEDERALLY SPONSORED RESEARCH

None

BACKGROUND

Field of the Invention

This invention applies to the general field of biometrics, and toward computer-performed facial recognition and human-performed facial identification. Specifically, the claimed invention relates to selective facial recognition assistance method and system.

Description of the Related Art

There are several major challenges with the current state-of-the-art in facial recognition algorithms and correct facial identification by computer systems. The problem stems from several issues: (1) the new use of Artificial Intelligence (AI), Deep Learning (DL), or Machine Learning (ML), for developing new face matching algorithms; (2) off-angle or poor-quality images either for probe image or reference images; and (3) match thresholds for determining a match or no-match.

AI, DL, and ML require the use of large numbers of photographs with known matching and no-match information. The photograph files can range from several hundred photographs to many millions of photographs. The algorithm developed is based on use of the photographs presented for a match or no match identification.

The selection set of the candidate photographs impact the matching performance of the algorithm. If the selected set of photographs used for training the algorithm contain primarily white males, then the algorithm will do better at matching white males then females, Asians or darker-skinned persons. Many developers try to use larger and more diverse datasets, but focused datasets have a greater probability of better performance when comparing to similar persons which were trained on the dataset.

Similar beliefs exist with humans. There are cases where a Caucasian may have difficulty in identifying or remembering an Asian face or distinguishing the difference between Japanese, Chinese or Korean faces. To an Asian, recognition may be easier, and distinctions can be more reliable. Similar arguments can be made about African Americans, Latinos and others of different races. A person taking a quick look at someone of similar race probably has a better chance in making a correct match or no-match than a person of a different race. This may not be true for a detailed facial examiner that has sufficient time to study the different facial features of two faces.

Facial recognition is defined in this application as a computer process that converts an image of a face into a template, then through a search algorithm and a template database, creates a match score against the templates in the database. Facial recognition is also defined as an examiner taking a Quick Look (Quick Look) or holistic look at a face and making a limited recommendation of "Likely," "Inconclusive" or "Unlikely" match.

Facial identification is defined in this application as a human comparing two or more face images, given sufficient time to determine if the images are an "Ident," "Likely," "Inconclusive," "Unlikely," or "Non-Ident." Note that the term "Ident" refers to the word identification.

With the use of mobile devices for facial recognition and identification, there are two additional problems: (1) the identification burden falls on the mobile device user to determine if the photographs are a match or no-match, and (2) lack of ability to rapidly search an additional larger database, one on the mobile device; and, if needed, a deep dive search of a larger database on a server system.

As facial image databases grow, the probability of false matches grows, and the match or no-match decision becomes more difficult. This problem is complicated because the photograph taken by the user of the mobile device may not have pristine standards. If the databases expand from 20,000 images to 100,000 images to millions of images, there is a high probability of false matches. This would require current mobile device users such as law enforcement officers or soldiers to make an identification decision based on looking at a small screen. This problem can lead to many other problems such as inadvertent arrests and unintentional racial profiling, or even lives lost on the battlefield.

Current state-of-the-art fails with: (1) the ability to search large databases on a mobile device, (2) the ability to search very large databases (over a billion) in server systems, (3) the ability of a facial identification examiner to offer rapid assistance to the person with the mobile device in making an identification decision, (4) the ability to select a search algorithm or examiner based on race, and (5) the ability to specify the level of detail for a search such as a Quick Look or Long Look.

SUMMARY OF THE EXEMPLARY EMBODIMENTS

The Selectable Facial Recognition Assistance Method and System (SFRA) invention will allow rapid, accurate match, no-match, likely, unlikely or inclusive decisions from combined computer and human evaluations. The SFRA will also allow the user to focus on the type of search and enhanced searches based on race identity, which will go against special algorithms and examiners that specialize in the special race category. This new approach to facial recognition and identification is based on new technology breakthroughs and expert, focused examiners. The SFRA provides critical assistance for users to conduct searches with a more powerful computer, and the expert identification services personnel can review those computer-generated matches that fall into a grey area in order to assist operators that cannot make a clear match or no-match.

From a law enforcement perspective, the SFRA will quickly recognize felons, missing persons, or other sought-after persons with a high degree of accuracy; thus preventing or greatly lessening the occurrence of false identifications or rejections, which will result in significantly fewer persons being taken to the station due to mismatches.

The SFRA is a breakthrough in providing the law enforcement officer, solider or user in the presence of an individual the ability to search a massive database to see if the subject person is in the database. A key application would be in law enforcement, determining if a person is in the Wants & Warrants list. Wants are personnel that are wanted by the law enforcement community for questioning potentially missing persons, or persons of interest. Warrants are typically arrest warrants for wanted persons. Due to recent breakthroughs in technology of extremely small facial template sizes, this capability would allow mobile devices to contain database sizes that were never thought possible before. Should the operator with a mobile device need a second opinion, additional advice, or a deeper search into massive databases, the officer can simply transmit the image to by pressing SFRA buttons where an examiner can provide additional identification advice and search extremely powerful computing systems. This text message or phone call to the mobile device can provide real-time instructions, assessments, warnings and documentation (what to do with the individual). In the Wants category, law enforcement may just have a photograph of a suspect and this facial recognition identification would be extremely helpful at bringing in a person from the photograph. An example may be video from bank robberies, persons standing next to criminals, or personnel standing next to missing persons.

In addition to Wants & Warrants databases, other databases for military use such as identifying suspects whereby the military has only photographs. Other databases for the military could be friendly in nature, such as determining if this person is a coalition member. Current technology relies on a person's uniform. With SFRA, countries could exchange valid images of their personnel for recognition and identification.

Additional databases for commercial use could be sports figures, politicians, actors—famous personnel that such a device could be used commercially for identifying personnel whose photographs are normally found on the Internet.

Other databases could contain DMV databases that would assist in recognizing an individual in traffic accidents or medical emergencies. This device could be used by Emergency Medical Transport (EMT) or emergency room personnel in identifying a person who is severely injured, incapacitated or unconscious to rapidly identify the individual with the purpose of getting the proper medical records and identification of next of kin, if necessary. The Stage Two component of our system is vital in ensuring that we have correctly identified the person. Medical organizations could have their own databases of patients to ensure the identity of personnel before offering medical services.

The system could also be used for rapidly identifying terrorists or wanted persons, or are time-sensitive wanted persons, by distributing the photograph to all mobile devices that contained matching software.

Another database would also be for customs and border personnel as a watchlist of who's coming in or documentation of who's entering or leaving the country.

According to an exemplary embodiment, a method for user selection of examiner assistance for facial recognition and facial identification of personnel by combining computer algorithms and examiners is provided. The method including: providing a means for photographing or entering a photograph of an individual and converting the individual's photograph into electronic media; providing a capability to transmit said individual's photograph or additional photographs to a data cloud or central server location; providing a capability to match said individual's photograph in the said data cloud or said central server; providing the capability to transmit data from the said data cloud back to said user; providing the capability for said user to transmit said individual photograph and matched photograph to a professional facial examiner; receiving said photographs from said mobile device and displaying said photographs on video screens in a manner that allows a professional facial matching examiner to conduct facial identification of said photographs; and, transmitting from said central server images, audio, or text messages back to said mobile device providing guidance on the results of said examination of photographs.

According to another aspect of the invention, a selective facial recognition assistance system is provided. The system including: a mobile phone device, laptop, or desktop computing device that processes facial images; a transmission device connected to said computing device that transmits images taken by the mobile phone device, laptop, or desktop computing device, to a data cloud; said data cloud contains a facial database and facial matching algorithm configured to match said images received from the transmission device to said data cloud with said facial matching algorithm; said data cloud being linked to a communication device to transmit matched images to said computing device; selective examination buttons on said computing device that allows the user to select the type of examination to be performed on the received images by a facial examiner, a communication system between said computing device and an examiner work station, and; said examiner work station comprising one or more examination screens and an examiner response system which communicates the examiner's assessment back to said transmission device.

According to another exemplary embodiment, another method for user selection of examiner assistance for facial recognition and facial identification of personnel by combining computer algorithms and examiners is provided. The method includes: means for photographing or entering a photograph of an individual and converting the individual's photograph into electronic media; transmitting said individual's photograph or additional photographs to a data cloud or central server location; matching said individual's photograph in the said data cloud or said central server; transmitting data from the said data cloud back to said user; said user transmitting said individual photograph and matched photograph to a professional facial examiner; receiving said photographs from said mobile device and displaying said photographs on video screens in a manner that allows a professional facial matching examiner to conduct facial identification of said photographs; and, transmitting images, audio, or text messages from said central server back to said mobile device providing guidance on the results of said examination of photographs.

Figure 1:
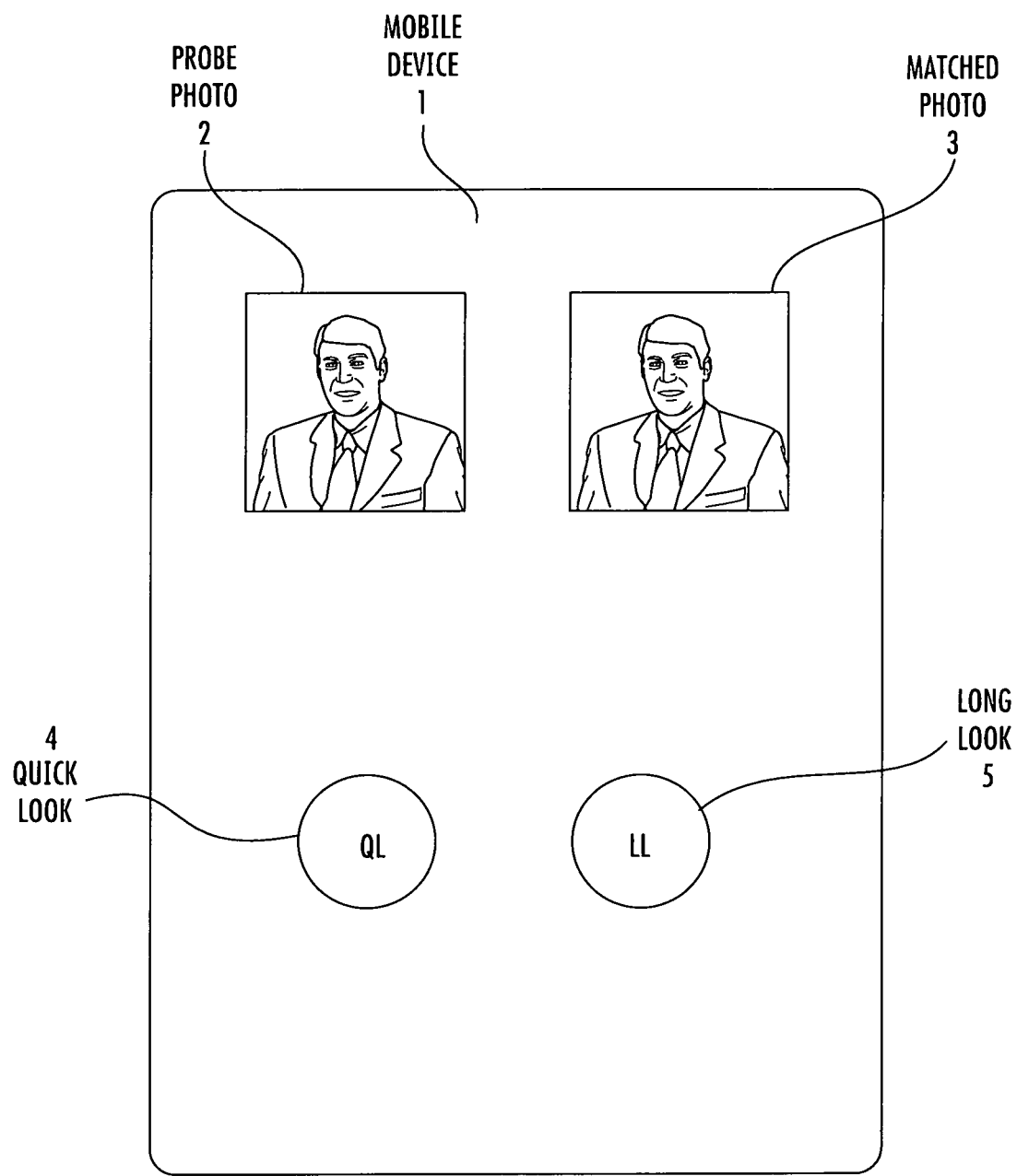
FIG. 1 shows the SFRA the mobile device and its basic features.

LIST OF REFERENCE NUMERALS 1 mobile device or laptop or workstation.
2 probe image.
3 matched image
4 Quick Look Button
5 Long Look Button
6 Information Cloud
7 face or biometric database in cloud or server
8 match algorithm in cloud or server
9 communication system from mobile device to cloud or server
10 additional image matches to probe image
11 communication system of examiner work station to mobile device
12 examiner's work station
13 Quick Look examiner work station buttons
14 Long Look examiner workstation buttons
15 probe image on examiner's workstation
16 match image on examiner's workstation
17 race button requesting focused Asian examination
18 race button requesting focused African American examination
19 race button requesting focused Latino examination
20 examiner's results transmitted to user
21 Asian optimized algorithm
22 African-American optimized algorithm
23 Latino optimized algorithm
24 match score
25 switch to direct photographs to the selected race algorithm

DETAILED DESCRIPTION OF THE EXEMPLARY EMBODIMENTS

Figure 2:
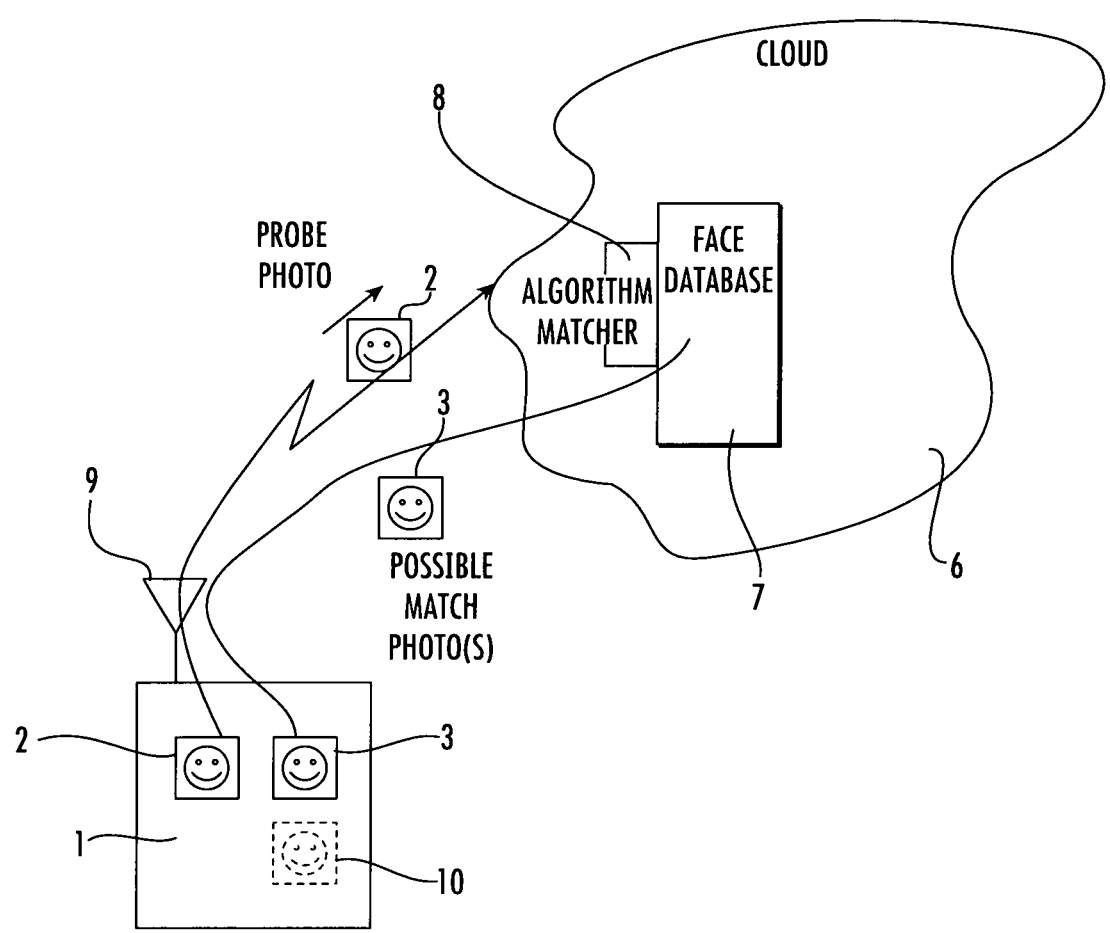
FIG. 2 shows the SFRA transmitting probe photograph to the cloud and receiving match photograph(s) back from the cloud.
Figure 3:
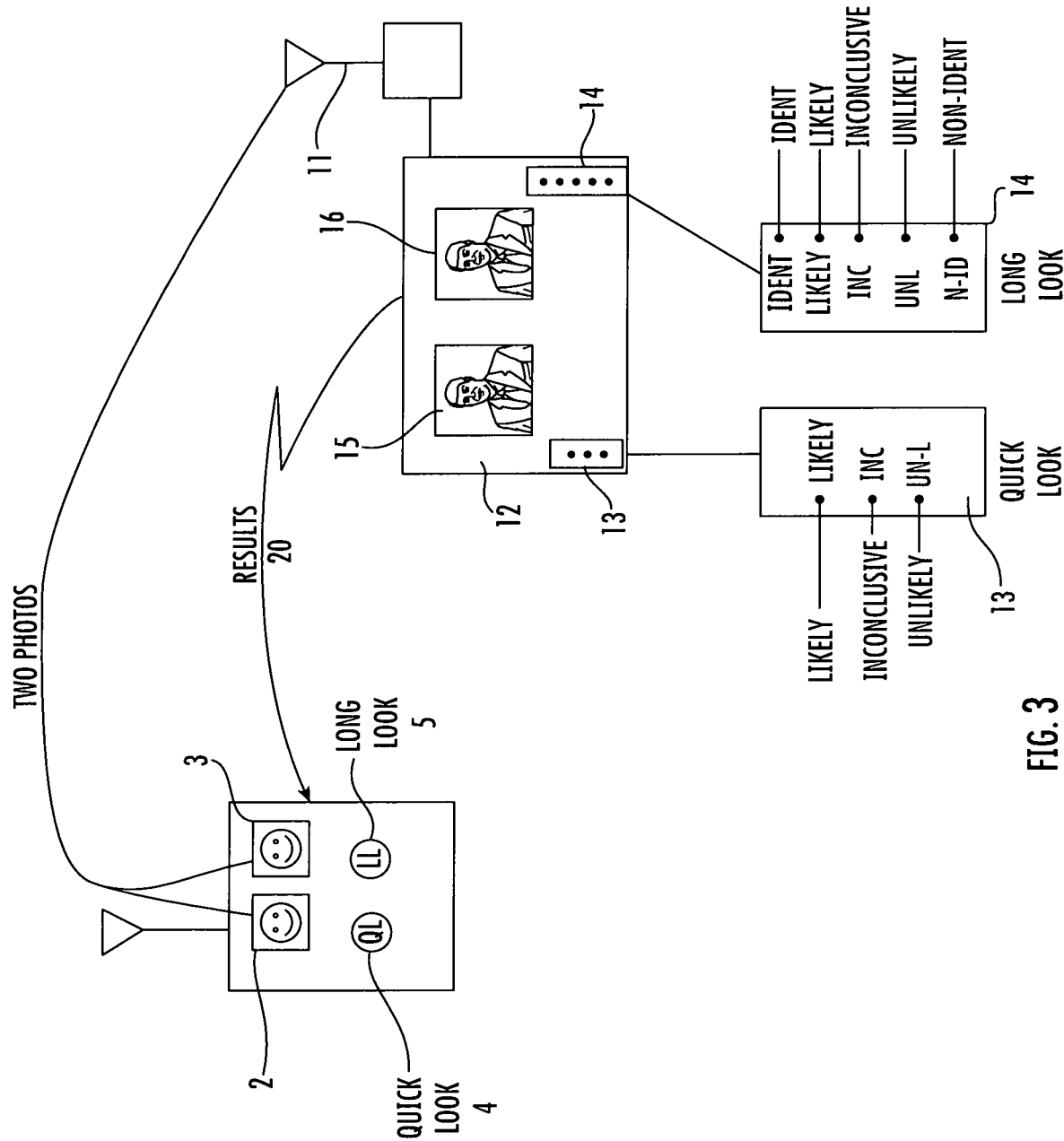
FIG. 3 shows the SFRA transmitting probe and match photograph(s) to the examiner station information flow between Stage One and Stage Two where only examination services are needed.

The first exemplary embodiment is illustrated in FIGS. 1-3. FIGS. 1, 2 and 3 are directed to a system where the user will take a picture of a suspect and transmit the photograph to a cloud; in the cloud is a database and a matching algorithm; the photograph that is sent to the cloud will be matched with photographs in a database and the highest match will be returned for additional photographs that are above a certain threshold. The user will then compare the photograph he took with the photographs that were returned from the identified match. In response to a situation where the user is not sure that a match has properly occurred, or policy dictates that a further analysis be performed, the user can select additional assistance. The user can ask for a "Quick Look," which is defined as a holistic approach and/or a separate algorithm scoring the match. The holistic approach is the examiner primarily looking at the entire face. The Quick Look is envisioned to take about 30 seconds. The examiner will look at the score on the algorithm on his/her machine, look at the holistic approach and then make a determination of "likely," "unlikely," or "inconclusive." The examiner then sends the response and possibly a text message back to the user. The user would then look at the result from the examiner and whether he is satisfied with the result. The user then takes the appropriate action. If the user is still not sure whether a match or no-match is accurate or wants a better confirmation because of the action he plans to take, such as arrest the person or let the person go, the user can press a "Long Look" button which would resubmit the photographs and the match to the examiner where the examiner would do a true facial comparison by looking at the components of the face: the side of the nose, the ear, the side of the eyes, the wrinkles on the forehead, etc. The Long Look is envisioned to take about 5 minutes. In the Long Look there are two additional categories that the Examiner has: 1) the two faces are an identification, which means it is the person, or 2) the two faces are not an identification, which means it is not the person being sought. Based on the quality of the photographs, the examiner may still not reach a conclusive decision of identification, rather a "likely," "unlikely," or "inconclusive." In the Quick Look, the Examiner will typically send a text message to the user in addition to his assessment.

FIG. 1 depicts the mobile device 1 containing the probe image 2 and the matched photograph 3. Also, on the mobile device 1 is a transmit button. In FIG. 1, two options are depicted: Quick Look (QL) 4 and Long Look (LL) 5. One button or more than two could be used depending on the organization's desire with respect to the Examiner's time and type of identification being conducted.

FIG. 2 depicts the mobile device 1 transmitting, via communication device 9, the probe image 2 to the cloud 6. Contained in the cloud is a face database 7 and an algorithm matcher 8. The probe image is submitted to the algorithm matcher 8, which uses the face database 7 to determine the closest match or the matches above an established threshold. The highest probable match is illustrated as 3. Additional matches above the threshold 10 are transmitted back from the cloud to the mobile device 1.

FIG. 3 depicts the user selecting either the Quick Look 4 or the Long Look 5 to transmit the two photographs, i.e., the probe photograph 2 and the match photograph 3, to the communication device at the examiner station 11. The photographs are then displayed on the examiner's screen 12. The probe image on the examiner's screen 15 is a lot larger than the probe image on the mobile device 2. This is the same for the matched photograph 16, which is larger than the match photograph on the mobile device 3. These larger photographs will allow the examiner to provide a more detailed analysis between the two faces. The examiner will know which button the user pressed, the Quick Look 4 or the Long Look 5, and the examiner will analyze the photographs accordingly. For a Quick Look, the examiner will have three choices 13: "likely," "unlikely," or "inconclusive." For the Long Look, the examiner will have five choices 14: "ident," "non-ident," "likely," "unlikely," or "inconclusive." The results 20 from the Examiner are transmitted back to the mobile device 1. The results 20 will show the Examiner's assessment to the user and will provide a text rationale to the user.

Figure 4:
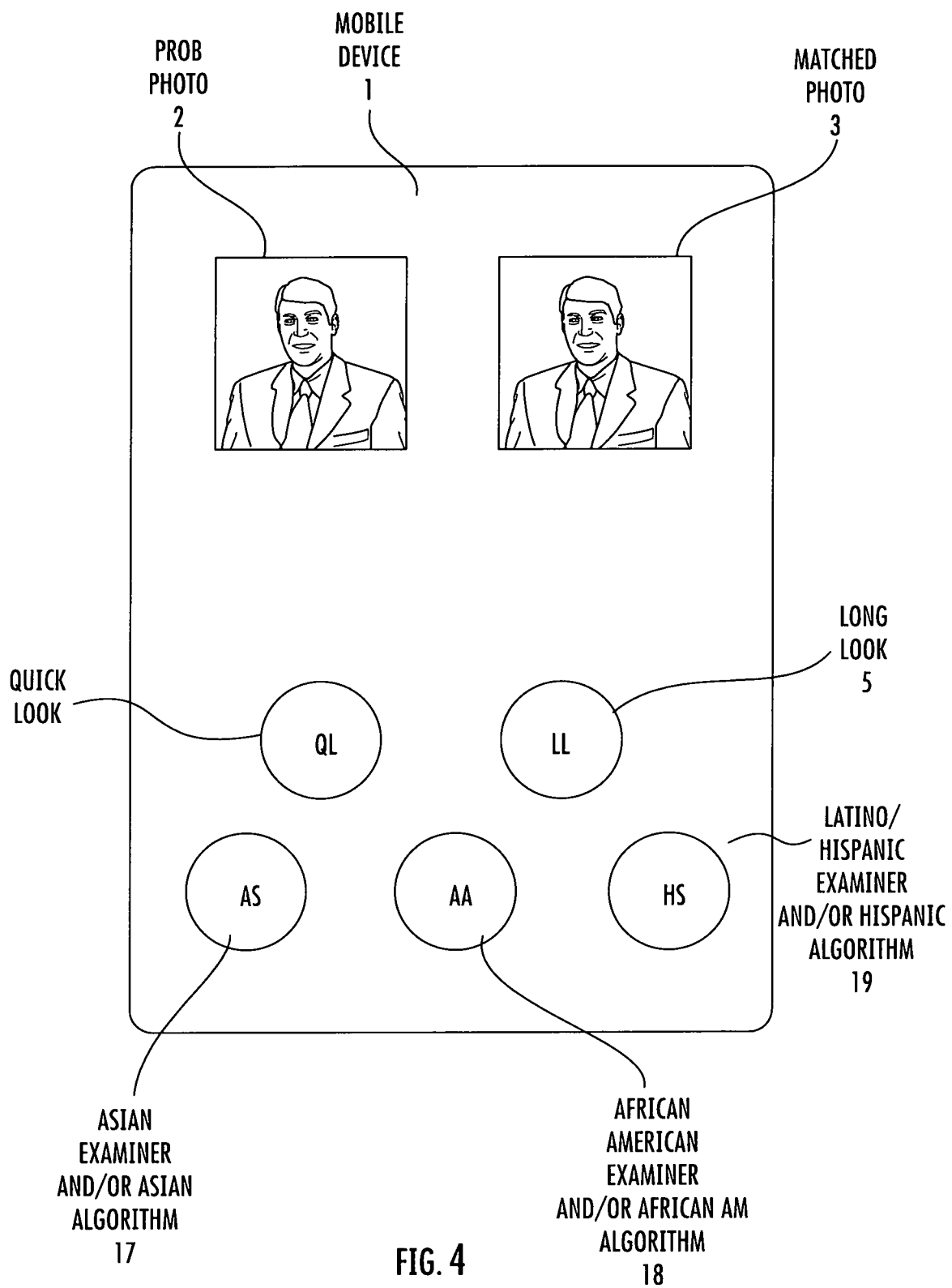
FIG. 4 shows the addition of racial selection buttons added to the SFRA device.
Figure 5:
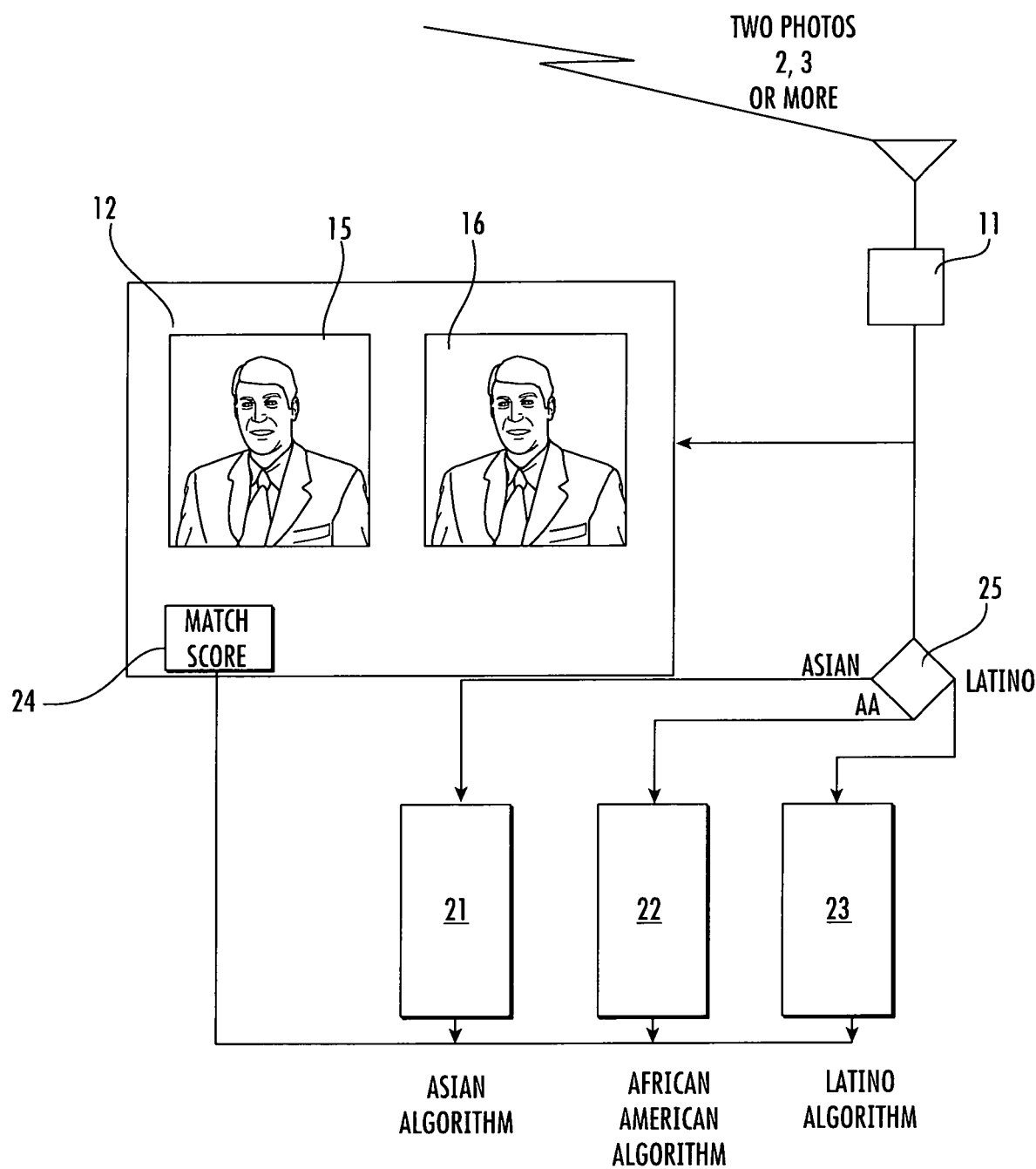
FIG. 5 shows the photograph flow with respect to race selected examinations and race selected algorithms.

FIGS. 4 and 5 represent an alternative exemplary embodiment. FIG. 4 depicts the addition of race-based selection buttons. In the exemplary embodiment displayed in FIG. 4 the user has the additional ability to select a detailed search based on race. FIG. 4 depicts an Asian race AS button, by which an algorithm developed for distinguishing Asians would be used and/or be used by an Asian Examiner. A similar situation exists for African-Americans 18; pressing the African-American race button AA would send the probe image and match photograph to an algorithm that's optimized for African-American persons and/or an African-American Examiner.

Additional buttons such as male or female can also be provided. The race-based Latino button HS 19 would bring a Latino-developed, optimized algorithm and/or a Latino Examiner. When a race button 17, 18, 19, or additional races and/or a gender button is pressed, the best match photographs are transmitted, as in FIG. 3. The photographs are then directed to the appropriate race algorithm and/or gender. The resulting score is presented to the Examiner, and the Examiner who specializes in that race would then do the comparison and send the results 20 back to the device. A Quick Look (QL) or Long Look (LL) could be used in any of these situations.

FIG. 5 depicts photographs arriving with a specific race examination request. The photographs are received through the communication system 11 and displayed on the Examiner's screen 12. The photographs are algorithms submitted to the switching unit 25 that will send the photographs to the appropriate race-optimized algorithm. The Asian-optimized algorithm 21, the African-American-optimized algorithm 22, or the Latino-optimized algorithm 23 would receive both photographs and produce a match score. Each of the optimized algorithms could be further divided into male and female, thus using twice the number of optimized algorithms. FIG. 5 depicts three races; more races could be embodied along with gender. The match score 24 is displayed on the Examiner's screen 12. The Examiner who is also certified for this specific race would compare the match score and the two photographs to make his determination. His determination choices would be based on the Quick Look or Long Look process.

Other exemplary embodiments could include different algorithms and be at different locations. Match algorithms could be on the mobile device, in the cloud, or at the Examiner station. The mobile device is envisioned to be portable such as an iPhone or iPad or could also be a laptop or workstation at a central facility. In this embodiment, the user is selecting photographs from video or other sources and sending them to the Examiner.

Another exemplary embodiment is a forensic Deep Look comparison of the photographs. This type of Deep Look is envisioned for court testimony. The Deep Look would be specially requested if the Examiner and not necessarily a button on the mobile device.

Yet another exemplary embodiment is replacing the mobile device with a laptop where the images are not necessarily taken from the laptop but are coming from forensic video or other devices that are sending the photographs to the central laptop or server.

The SFRA Method and System will provide the highest degree of match confirmation and no-match confirmation to the combination of machine and human. This system allows lower thresholds for face matching that will prevent persons from going below the threshold through off-angle sunglasses, disguises and other attempts to reduce their match signature. By lowering the threshold, you are getting a significantly higher number of false matches, but the human examiner will filter those out. By lowering the threshold, you have greater probability of a match being presented to the Examiner rather than be eliminated through not achieving the threshold. This system will greatly benefit citizens from being falsely arrested, citizens that should be allowed access to be allowed access, and persons that are sought after to be identified. Although several exemplary embodiments have been disclosed, the invention is not limited thereto because those skilled in the art will readily be aware of other modifications. Rather, the invention is limited by the scope of the appended claims.

The invention claimed is:

1. A method of providing a selective facial recognition assistance method and system (SFRA), including a first stage of a computer performed facial recognition and a second stage of human performed facial identification; the method comprising the steps of:

a. a user photographing an individual; the user utilizing a mobile device including a camera as well as both a computer and a database;

b. transmitting the picture of the individual to a data cloud or central server location;

c. matching the individual's photograph in the data cloud or the central server;

d. transmitting the matched photograph from the data cloud or central server back to the mobile device of the user, wherein the processing of the matched image is completed on the mobile device in the first stage;

e. the user evaluating whether or not a match exists between the photograph taken and the matched photograph from the data cloud or central server; the user making a quick look or long look of the photograph and the possible matching photograph; the quick look includes whether a match is likely, inconclusive or unlikely; and the long look include whether the possible matching photo identifies the individual or likely identifies the individual or inconclusively identifies the individual or is unlikely to identify the individual or does not identify the individual in the possible match photo;

f. converting the individual's photograph into electronic media on the mobile device of the user;

g. electronically matching said individual's photograph on said user's mobile device;

h. upon a determination by the user that it is unclear as to whether the photograph taken is or is not correctly identified by the cloud or central server;

i. the user initiates the second stage;

j. in the second stage, the user, seeking a second opinion, transmits both the individual photograph and the matched photograph to a professional expert facial examiner who is an expert in facial identification;

k. the professional expert identification examiner, upon receiving said photograph and possible matching photographs from the user, displays the photographs on video screens in a manner that allows the professional expert facial identification examiner to conduct facial identifications of the photographs, and transmitting photographs, images, audio or text messages from the central server back to the mobile device, providing guidance on the results of the examination of the photographs to the user;

l. the professional expert facial identification examiner is separate from the user, who is not near the level of expertise of the professional expert facial identification examiner;

m. performing the second stage using a computer that is very powerful compared to the computer in the mobile device operated by the user;

n. providing the computer of the second stage with a low threshold gray area which reduces the likelihood of false identification or false rejection by allowing the user having a mobile device for evaluating photographs for identification of an individual, to obtain assistance in reviewing the computer generated photos through the use of expert facial identification services personnel who review the computer generated matches that fall into the grey area and provide guidance regarding identification to the user;

o. transmitting from said central server images audio, or text messages back to said mobile device after the expert professional facial identification examiner finishes their evaluation and provides guidance on results of said examination of photographs, with respect to matches, no match, likely, unlikely or inconclusive matches at a higher likelihood of accuracy and lower chances of false identification than what would have been obtained without the threshold being lowered to a grey area.

2. The method of claim 1, wherein photographs to be matched are derived from video cameras and databases.

3. The method of claim 1, wherein the user is offered additional choices as to the time and detail of study that the expert professional facial examiner spends before developing an assessment of the photographs.

4. A method of providing a selective facial recognition assistance method and system (SFRA), including a first stage of a computer performed facial recognition and a second stage of human performed facial identification; the method comprising the steps of:
   a. a user photographing an individual; the user utilizing a mobile device including a camera as well as both a computer and a database;
   b. transmitting the picture of the individual to a data cloud or central server location;
   c. matching the individual's photograph in the data cloud or the central server;
   d. transmitting the matched photograph from the data cloud or central server back to the mobile device of the user, wherein the processing of the matched image is completed on the mobile device in the first stage;
   e. the user evaluating whether or not a match exists between the photograph taken and the matched photograph from the data cloud or central server; the user making a quick look or long look of the photograph and the possible matching photograph; the quick look includes whether a match is likely, inconclusive or unlikely; and the long look includes whether the possible matching photo identifies the individual or likely identifies the individual or inconclusively identifies the individual or is unlikely to identify the individual or does not identify the individual in the possible match photo;
   f. converting the individual's photograph into electronic media on the mobile device of the user;
   g. electronically matching said individual's photograph on said user's mobile device;
   h. upon a determination by the user that it is unclear as to whether the photograph taken is or is not correctly identified by the cloud or central server;
   i. the user initiates the second stage;
   j. in the second stage, the user, seeking a second opinion, transmits both the individual photograph and the matched photograph to a professional expert facial examiner who is an expert in facial identification;
   k. the professional expert identification examiner, upon receiving said photograph and possible matching photographs from the user, displays the photographs on video screens in a manner that allows the professional expert facial identification examiner to conduct facial identifications of the photographs, and transmitting photographs, images, audio or text messages from the central server back to the mobile device, providing guidance on the results of the examination of the photographs to the user;
   l. the professional expert facial identification examiner is separate from the user, who is not near the level of expertise of the professional expert facial identification examiner;
   m. performing the second stage using a computer that is very powerful compared to the computer in the mobile device operated by the user;
   n. providing the computer of the second stage with a low threshold gray area which reduces the likelihood of a false identification or false rejection by allowing the user having a mobile device for evaluating photographs for identification of an individual, to obtain assistance in reviewing the computer generated photos through the use of expert facial identification services personnel who review the computer generated matches that fall into the grey area and provide guidance regarding identification to the user;
   o. transmitting from said central server images, audio, or text messages back to said mobile device after the expert professional facial identification examiner finishes their evaluation and provides guidance on results of said examination of photographs, with respect to matches, no match, likely, unlikely or inconclusive matches at a higher likelihood of accuracy and lower chances of false identification than what would have been obtained without the threshold being lowered to a grey area.

5. The method of claim 4, wherein photographs to be matched are derived from video cameras and databases.

6. The method of claim 4, wherein the user is offered additional choices as to the time and detail of study that the professional expert facial identification examiner spends before developing a match assessment of the photographs.

* * * * *